No. 861,811. PATENTED JULY 30, 1907.
E. J. CONDON.
ELECTRICAL WATER HEATER.
APPLICATION FILED NOV. 1, 1906.
2 SHEETS—SHEET 1.
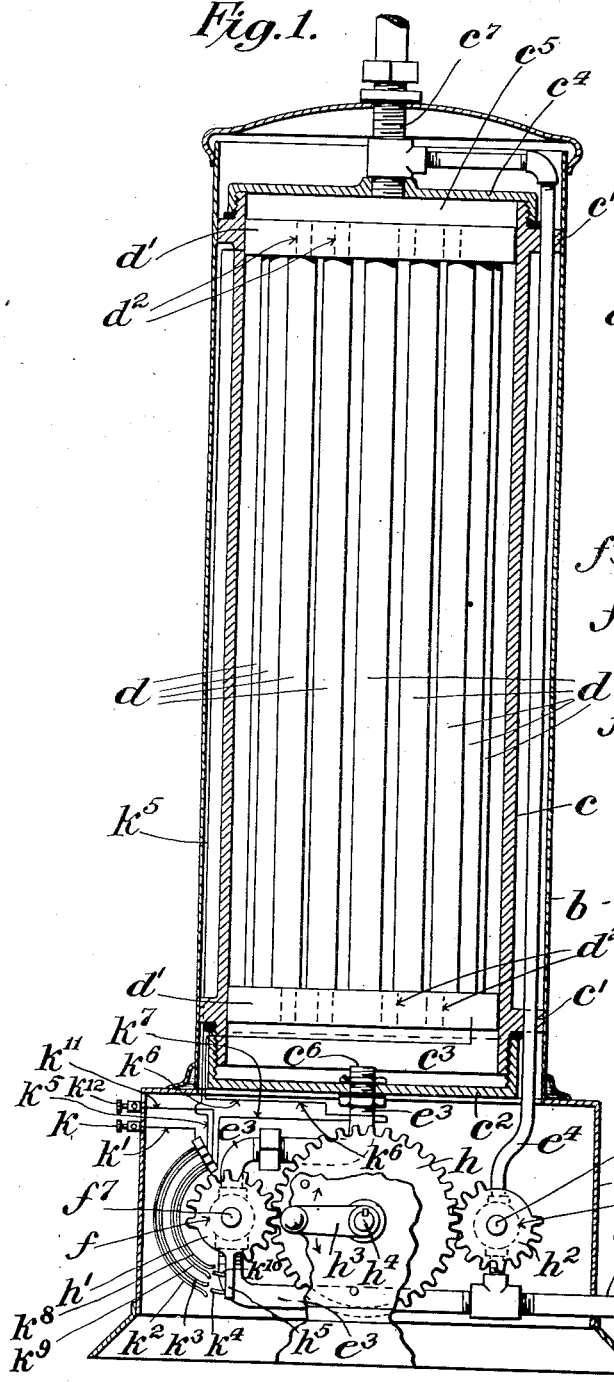
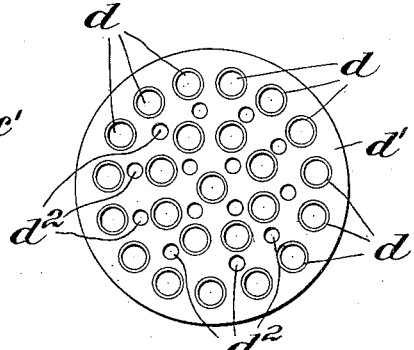
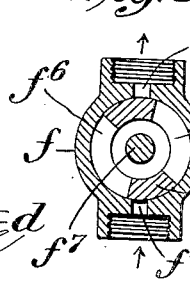
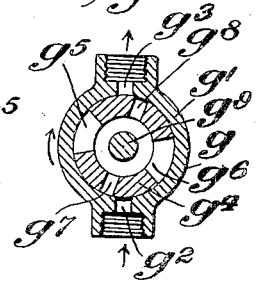
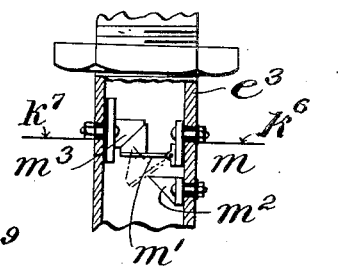
Attest:
Edgeworth Green
A. L. Reilly
Inventor:
Edward J. Condon
by Redding, Kiddle & Greeley
Attys No. 861,811. PATENTED JULY 30, 1907.
E. J. CONDON.
ELECTRICAL WATER HEATER.
APPLICATION FILED NOV. 1, 1906.
2 SHEETS—SHEET 2.
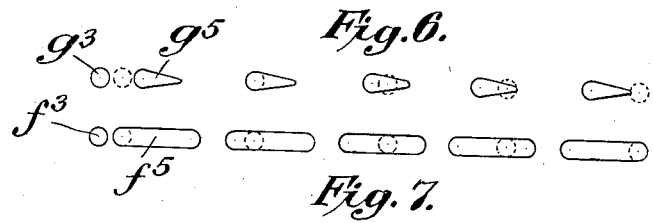
Fig. 6.
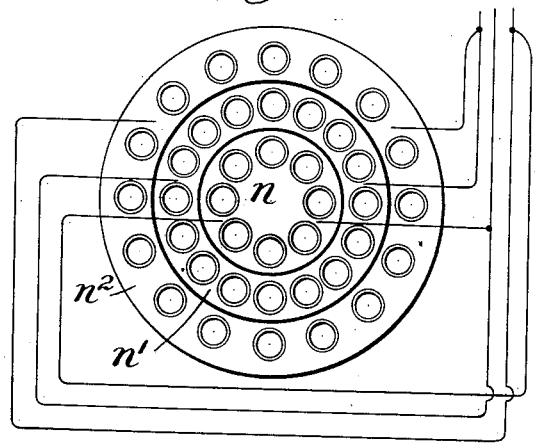
Fig. 7.
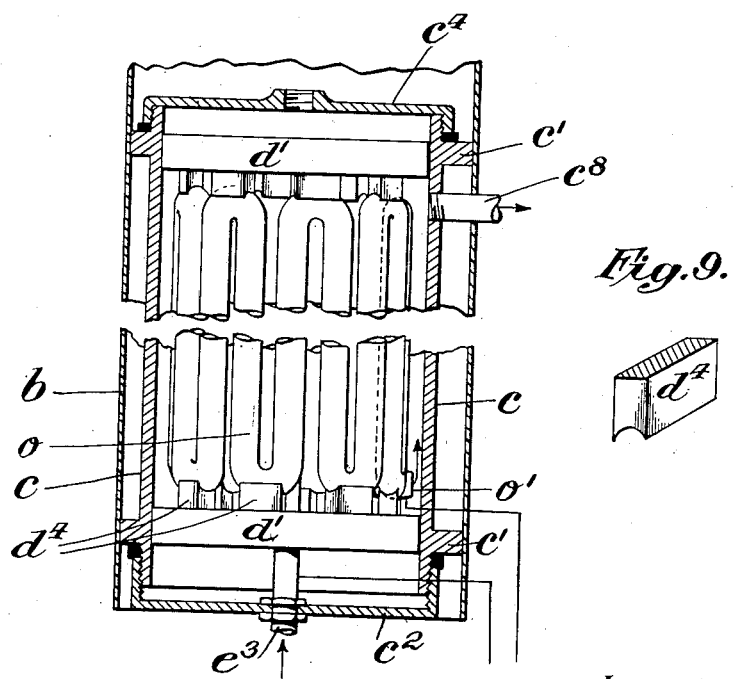
Fig. 8.
Fig. 9.
Attest:
Edgeworth Greene
A. L. Reilly.
Inventor:
Edward J. Condon
by Redding, Kiddle & Greeley
Attys.

UNITED STATES PATENT OFFICE.

EDWARD J. CONDON, OF NEW YORK, N. Y., ASSIGNOR OF ONE-THIRD TO ELEAZER I. RAINS AND ONE-THIRD TO GEORGE W. RUPPERT, OF NEW YORK, N. Y.

ELECTRICAL WATER-HEATER.

No. 861,811.          Specification of Letters Patent.          Patented July 30, 1907.

Application filed November 1, 1906. Serial No. 341,545.

*To all whom it may concern:*

Be it known that I, EDWARD J. CONDON, a citizen of the United States, residing in the borough of Manhattan of the city of New York, State of New York, have invented certain new and useful Improvements in Electrical Water-Heaters, of which the following is a specification, reference being had to the accompanying drawings, forming a part hereof.

The object of this invention is to produce an electrical water heater, that is, a water heater in which an electrical current is relied upon as the source of heat, of such efficiency as to make it desirable as a substitute for the usual means for supplying hot water in private residences, apartment houses and other places of use, thereby doing away with the expensive and cumbersome installation of the usual hot water system with its boiler and pipe connections and eliminating the cost of fuel and of attendance necessary to maintain the water in such a system at the required temperature, besides avoiding the drawbacks incident to the ordinary hot water systems, such as the drawing off of the hot water in one part of the building and the bursting or breaking of pipes.

It has also been sought to so construct the improved apparatus as to enable it to be operated properly by any person of ordinary intelligence, to make it impossible for the electric current to be transmitted through the heating element unless water is flowing through the apparatus, and to make it possible to deliver cold, warm or hot water as required and without danger of delivering scalding hot water too suddenly.

It has also been sought to provide an apparatus which in every way shall be well adapted for the intended purpose.

The invention will be more fully explained hereinafter with reference to the accompanying drawings in which it is illustrated and in which—

Figure 1 is a view partly in elevation and partly in vertical central section of an apparatus which embodies the invention. Fig. 2 is a detail plan view of one of the conducting heads. Figs. 3 and 4 are detail views, in section, and on a larger scale, of the valves employed. Fig. 5 is a detail view, partly in section and on a larger scale, of the automatic contact making devices. Fig. 6 is a diagrammatic view illustrating the relations of the hot and cold water valve ports. Fig. 7 is a detail, and partly diagrammatic, view illustrating a multiple arrangement of the heating units. Fig. 8 is a partial view, partly in vertical section and partly in elevation, illustrating still another heating element. Fig. 9 is a detail view of one of the spacing blocks shown in Fig. 8.

In the embodiment of the invention represented in Fig. 1 of the drawings, the apparatus comprises a suitable base $a$, which is preferably rectangular, and a protecting shell or casing $b$ of metal which is erected upon the base $a$.

Within the shell or casing $b$ is disposed a cylinder $c$ of porcelain or other suitable insulating material, provided with flanges $c'$ and $c'$ which fit snugly within the casing $b$. A cap $c^2$ closes the lower end of the cylinder $c$ and forms a header or distributing chamber $c^3$, while a similar cap $c^4$ closes the upper end of the cylinder and forms a header or collecting chamber $c^5$.

Within the cylinder $c$ are disposed a number of tubes $d$ of carbon or other conducting material which is capable of being raised to a high temperature by the passage of an electric current of suitable strength. The tubes $d$ are supported by disks $d'$ of similar material, being closely united therewith and opening therethrough as clearly indicated in Fig. 2. The disks are also perforated as at $d^2$. The water, which is admitted to the chamber $c^3$ through an inlet $c^6$, and escapes from the chamber $c^5$ through an outlet $c^7$, thus passes around the tubes $d$ as well as through them, being brought in contact with the outer surfaces of such tubes as well as with the inner surfaces, so that the maximum effect of the heating element is secured.

The water to be heated is supplied from any suitable source through a pipe $e$ which may be provided with a valve $e'$ and with a filter $e^2$. The pipe is directly connected, as by the pipe $e^3$, with the inlet $c^6$ through which water is admitted to the heating element, and there is also provided a by-pass $e^4$, connected with the pipe $e^3$ and with the outlet pipe $c^7$, by means of which cold water may be supplied without having it pass through the heater. The main supply pipe $e^3$ and the by-pass $e^4$ are controlled by valves which are operated from a single handle in such manner that the water which first flows from the outlet $c^7$ is at or near the normal temperature of the water supplied to the heater and is then gradually raised in temperature until the highest temperature is reached, all of this being effected by movement of the controlling handle from its initial point in one direction. To accomplish the gradual increase of the temperature of the water, the by-pass $e^4$ is at first opened to its full extent immediately after the opening of the main supply pipe $e^3$, so that the temperature of the water which passes through the heater is reduced by the addition of cold water. As the movement of the controlling handle is continued the passage of water through the by-pass is gradually reduced and finally cut off altogether so that the water finally issues from the outlet at its maximum temperature. Movement of the controlling handle from its initial position in the opposite direction simply opens the by-pass alone and permits the flow from the outlet of water which has not been in contact with the heater.

Various forms of valves to accomplish the desired purpose might be employed. A suitable form is shown in Figs. 3 and 4, Fig. 3 showing the valve $f$ which controls the flow of water through the pipe $e^3$, and Fig. 4 showing the valve $g$ which controls the flow of water through the by-pass $e^4$. The valve $f$ is of usual form, comprising a valve seat $f'$ with inlet port $f^2$ and outlet port $f^3$, and a valve plug $f^4$ having opposite, elongated ports $f^5$ and $f^6$, the plug being carried by the spindle $f^7$. The valve $g$ for the by-pass is likewise of ordinary construction and comprises a valve seat $g'$ having an inlet port $g^2$ and an outlet port $g^3$ and a valve plug $g^4$ having two opposite, elongated ports $g^5$ and $g^6$, and also two opposite ports $g^7$ and $g^8$, the valve plug being carried by a spindle $g^9$. The two spindles are connected for simultaneous operation by a common controller handle.

As shown in the drawings, the spindles $f^7$ and $g^9$ are provided respectively with gears $h'$ and $h^2$ which are engaged by a common intermediate gear $h$, which has a controlling handle $h^3$ applied to its shaft $h^4$, the latter being mounted in suitable bearings. It will now be obvious that the movement of the controlling handle $h^3$ produces rotary movement of the valve plugs in opposite directions.

The relation of the ports in the valve blocks is represented diagrammatically in Fig. 6, it being understood that the relative arrangement of the opposite ports of each pair is the same. As indicated therein, the port $f^5$ is elongated and of uniform width from end to end, while the corresponding port $g^5$, also elongated, but of less length than the port $f^5$, is gradually reduced in width, tapering from its forward end to its rearward end.

When the valves are in the positions shown in Figs. 3 and 4, the passage of water is prevented, but when the handle $h^3$ is moved downward from the initial position in which it is shown in Fig. 1, the end of the port $f^5$ is first brought into registration with the outlet port $f^3$, thus permitting water to flow through the heating element. As the movement is continued in the same direction the larger end of the port $g^5$ is brought into registration with the port $g^3$, thus permitting water to flow through the by-pass and, mingling with the heated water in the outlet $c^7$, to reduce its temperature. As the movement is further continued the flow of water through the by-pass is gradually reduced, as clearly indicated in Fig. 6, and finally is cut off altogether while the port $f^5$ still remains in registration with the port $f^3$, so that under this condition the heated water flows from the outlet $c^7$ without admixture of any cold water whatsoever. When the movement of the controlling handle $h^3$ is reversed, after having reached its extreme position, the flow of cold water through the by-pass is gradually increased while the flow of water through the heater continues, and then the flow of water through the main supply pipe and through the by-pass is cut off. If the controlling handle $h^3$ is moved upward from its initial position, shown in Fig. 1, the main supply valve $f$ remains closed and the ports $g^7$ and $g^8$ of the by-pass valve $g$ are brought into registration with the ports $g^2$ and $g^3$, permitting the water to flow through the by-pass alone so that it issues from the outlet $c^7$ without having been brought into contact with the heating element.

The electrical connections for supplying current to the heating element are controlled manually by the controlling handle $h^3$ and are also controlled automatically by the flow of water to the heating element. The controlling means are so arranged that no current flows through the heating element when both valves are closed and so that a switch is closed immediately after the movement of the controlling handle $h^3$ to open the valve $f$ has commenced, the circuit through the heater being completed automatically as soon as the flow of water to the heating element has assumed some volume. In this manner all arcing between outside contacts is prevented and it is impossible to throw current on the heating element until it is submerged in water. The movement of the controlling handle $h^3$ upward from its initial position, for the purpose of opening the valve $g$ alone, does not close any part of the electrical connections. As shown in Fig. 1 of the drawing, connection with one side of the main supply circuit is made at $k$ and thence by wire $k'$ to one of the contacts of a pair $k^2$, $k^3$, which are placed in electrical connection by a conducting blade $k^4$ carried by an arm $h^5$ on the gear wheel $k'$. The contact $k^3$ is connected by wire $k^5$ with the upper head $b'$ of the heating element. The lower head $b'$ of the heating element is connected by wire $k^6$ with an automatic circuit closer $m$ which will be more particularly described hereinafter. The other side of the circuit closer $m$ is connected by wire $k^7$ with one of a pair of contacts $k^8$, $k^9$, adapted to be placed in electrical connection by a blade $k^{10}$, also carried by the arm $k^5$ of the gear $h'$. The other contact $k^9$ is connected by wire $k^{11}$ with the other terminal $k^{12}$ of the main circuit.

The automatic circuit closer $m$, shown in Fig. 5, is intended to be operated automatically by the current of water flowing through the pipe $e^3$. The conductor $k^6$ is connected electrically to an insulated, movable contact $m'$ which, when no water is flowing through the pipe $e^3$, rests upon a stop $m^2$, as shown by dotted lines in Fig. 5. As soon as the flow of water through the pipe becomes substantial, the contact $m'$, which is very light, is moved by the current of water against the insulated contact $m^3$. In this manner provision is made for completing the electrical circuit through the heating element only when the flow of water has commenced. Moreover as contact is made by the blades $k^4$ and $k^{10}$ with the switch terminals before the circuit is completed through the automatic device, there can be no arcing of the current at the outside switch.

It is obvious that the heating element might be variously arranged. In Fig. 7, three heating elements, $n$, $n'$ and $n^2$, in other respects similar to what is shown in Fig. 1, are shown in a concentric multiple arrangement, the several elements being shown as separately connected to a three wire system. This arrangement is particularly adapted for water heating apparatus of large capacity.

In Fig. 8, the water supply pipe $e^3$ is connected to one end of a continuous coil of pipe $o$ which is suitably supported by blocks $d^4$ on the inner faces of the disks $d'$. The blocks $d^4$ and the disks $d'$ are made of suitable non-conducting material and the electrical connections are made direct with the ends of the coil of pipe. The coil $o$ terminates in an open mouth $o'$ within the insulating cylinder $c$ and the outlet $c^8$ is connected with the cylinder between the heads $d'$. The water which passes through the series of heating element $o'$ thus also circulates about the outside of the same before it escapes at the outlet $c^8$ and the maximum efficiency of the heating element is secured.

It will be understood that in all of the modifications of the apparatus provision is made, as already described, for the submersion of a heating element in water before the electrical connection is made, so that the burning out of the heating element and its injury by sudden changes of temperature are prevented. It will be observed, moreover, that as both the inner and the outer surfaces of each tube are in contact with water the liability of injury to the device by burning out or scaling off on one surface, so that the tubes become eventually so weakened as to be unable to withstand the water pressure, is also avoided.

Various other modifications will suggest themselves as adapted to various conditions of use and it will be understood that the invention is not limited to the precise details of construction and arrangement shown and described herein.

I claim as my invention:

1. An electrical water heater comprising a heating element consisting of a plurality of conducting pipes, conducting supports therefor perforated to permit passage of water around as well as through the pipes and a shell inclosing and forming a chamber about the same, means to supply water through the pipes and chamber and means to supply electrical current to the heating element.

2. An electrical water heater comprising an insulating shell having an inlet and an outlet, conducting disks within the ends of said shell, conducting pipes supported by said disks and opening through the same, means to supply water to one end of said shell and means to supply electrical current to said disks and pipe.

3. An electrical water heater comprising an insulating shell, caps to close the ends of said shell and provided the one with an inlet and the other with an outlet, conducting disks supported within the ends of the shell, conducting tubes supported by and opening through said disks, a distributing chamber being formed between one of said disks and the inlet end of the shell and a collecting chamber being formed between the other of said disks and the outlet end of said shell, means to supply water to said inlet and means to supply electrical current to said disks and pipes.

4. An electrical water heater comprising a heating element, means to supply water thereto, means to supply electrical current thereto and an automatic circuit closer included within the water connections and having a movable terminal included in the circuit connections and adapted to be moved by the water into contact with another terminal of the circuit connections to close the circuit.

5. An electrical water heater comprising a heating element, means for supplying electrical current thereto, a water supply pipe connected thereto, and an automatic circuit closer mounted in said water supply pipe and having a movable terminal included in the circuit connections and adapted to be moved by the flow of water through the pipe into contact with another terminal of the circuit connections to close the circuit.

6. An electrical water heater comprising a heating element, means to supply water thereto, means to supply electrical current thereto, a hand-operated switch in the electrical connections external to the water supply and an automatic circuit closer included within the water connections and having a movable terminal included in the circuit connections and adapted to be moved by the water into contact with another terminal of the circuit connections to close the circuit.

7. An electrical water heater comprising a heating element, means to supply electrical current thereto, means to supply water to the heating element, a by-pass to permit the flow of water around the heating element without contact therewith, and means to regulate the flow of water through the heater and through the by-pass.

8. An electrical water heater comprising a heating element, means to supply electrical current thereto, means to supply water directly to the heating element, said means including a valve, a by-pass to permit the flow of water around the heating element, said by-pass including a valve and common controlling means for said valves.

9. An electrical water heater comprising a heating element, means for supplying electrical current thereto, means for supplying water directly to the heating element, said means including a valve, a by-pass to permit the flow of water around the heating element, said by-pass also including a valve, and common controlling means for said valves, said direct supply valve having an elongated port and said by-pass valve having an elongated tapered port whereby the flow of water through the by-pass takes place simultaneously with the flow through the heater and is progressively reduced.

10. An electrical water heater comprising a heating element, means to supply electrical current thereto, means to supply water directly to the heating element, said means including a valve, a by-pass to permit the flow of water around the heating element, said by-pass including a valve, and common controlling means for said valves, the direct supply valve having an elongated port and the by-pass valve having an elongated tapered port corresponding with the elongated port of the direct supply valve and an additional port through which water may be permitted to flow while the direct supply valve is closed.

11. An electrical water heater comprising a heating element, means to supply electrical current thereto, means to supply water thereto, a valve included in the water supply, a switch operatively connected with the valve to close the circuit as the valve is opened and an automatic circuit closer included within the water connections and having a movable terminal adapted to be moved by the water to close the circuit after it has been closed by the switch.

This specification signed and witnessed this 29th day of October A. D., 1906.

EDWARD J. CONDON.

Signed in the presence of—
 THOMAS J. CANTY,
 W. B. GREELEY.